United States Patent [19]

Lane

[11] Patent Number: 5,544,985
[45] Date of Patent: Aug. 13, 1996

[54] DEEP BORE DRILLING APPARATUS WITH ROTATABLE SINGLE TUBE SYSTEM

[75] Inventor: Jerry A. Lane, Stanwood, Mich.

[73] Assignee: Autodie International, Grand Rapids, Mich.

[21] Appl. No.: 306,817

[22] Filed: Sep. 15, 1994

[51] Int. Cl.⁶ .................................................. B23B 41/02
[52] U.S. Cl. .............................. 408/56; 408/59; 408/67; 408/705
[58] Field of Search ............................ 408/56, 705, 67, 408/57, 59; 409/137, 136

[56] References Cited

U.S. PATENT DOCUMENTS

| | | | |
|---|---|---|---|
| 2,708,852 | 5/1955 | Wohlfahrt | 408/59 |
| 2,770,172 | 11/1956 | Graves | 409/137 |
| 3,422,706 | 1/1969 | Lunsford . | |
| 3,511,120 | 5/1970 | Käser . | |
| 3,591,301 | 7/1971 | Kaser | 408/56 |
| 3,701,606 | 10/1972 | Bogsten . | |
| 3,845,589 | 11/1974 | Mai, Jr. . | |
| 4,092,083 | 3/1978 | Larry . | |
| 4,119,388 | 10/1978 | Armitage . | |
| 4,137,002 | 1/1979 | Barker et al. . | |
| 4,405,266 | 9/1983 | Hansen et al. . | |
| 4,574,439 | 3/1986 | Weiblen . | |
| 4,591,300 | 5/1986 | Weiblen et al. | 408/56 |
| 4,626,149 | 12/1986 | Holy et al. . | |
| 4,726,717 | 2/1988 | Schmid . | |
| 4,842,450 | 6/1989 | Donovan et al. . | |
| 4,869,627 | 9/1989 | Weiblen . | |
| 4,932,814 | 6/1990 | York . | |
| 5,092,716 | 3/1992 | Omi . | |
| 5,120,167 | 6/1992 | Simpson . | |
| 5,174,691 | 12/1992 | Shepley . | |
| 5,181,812 | 1/1993 | Labinka . | |

FOREIGN PATENT DOCUMENTS

| | | |
|---|---|---|
| 1040877 | 10/1958 | Germany . |
| 0259303 | 12/1985 | Japan ........................................ 408/59 |
| 2-311208 | 12/1990 | Japan . |
| 502715 | 4/1976 | Russian Federation . |
| 1435166 | 5/1976 | United Kingdom . |

OTHER PUBLICATIONS

SANDUIK Coromant, Deep–Hole Drilling, 1984, pp. 1–46.
Eldorado Tool & Mfg. Corp. publication, *Gundrilling* (Milford, CT, undated). Copy in Class 408/705.

*Primary Examiner*—Steven C. Bishop
*Attorney, Agent, or Firm*—Young & Basile, P.C.

[57] ABSTRACT

A drilling apparatus for penetrating material includes an elongated rotary tool for boring an aperture in a workpiece by turning about a longitudinal axis and for moving along the longitudinal axis relative to the workpiece during a cutting operation. The tool also includes a cutting head mounted on an end of an elongated, hollow shaft. A fluid circulation system brings a flowable substance temporarily into engagement with the workpiece during the cutting operation. The circulation system forces the flowable substance to flow in a passage defined by an external surface of the shaft and the workpiece toward the cutting head along an entire longitudinal length of the aperture being drilled. The flowable substance exits the aperture through the hollow shaft after flushing material from the cutting head.

20 Claims, 4 Drawing Sheets sheet

DEEP BORE DRILLING APPARATUS WITH ROTATABLE SINGLE TUBE SYSTEM

FIELD OF THE INVENTION

The present invention relates to a gundrill for penetrating material by means of a cutting tool that turns about an axis and moves relative to a workpiece along that axis during a cutting operation, and more particularly, to a deep boring or drilling machine for forming a deep aperture having an exceptionally high ratio of depth to diameter, where the machine includes a spindle unit which is horizontally displaceable on a machine bed and is driven by a spindle drive.

BACKGROUND OF THE INVENTION

In deep hole drilling, it is traditional to refer to a high ratio between the aperture depth and the aperture diameter. Originally, the term "deep holes" referred to aperture depth of over five times the diameter. Today, the term "deep hole drilling" is used to describe methods for the machining of both short and deep holes, while it is the only method for drilling aperture lengths of more than ten times the diameter, it can also be competitive for short apertures down to two times the diameter because of its high metal removing capacity and precision. As in all metal machining operations, it is important that the material chips be broken and transported away without jamming and without effecting the drilled surface. Three different systems have been developed that permit trouble free machining of apertures depths of more than 100 times the diameter.

The first system is referred to as a gundrill system, where the cutting fluid is supplied through a duct inside the drill and irrigates the cutting edge, after which the cutting fluid removes the chips through a V-shaped chip flute along the outside of the drill. The cross-section of the tube occupies ¾ of its circumference due to the V-shaped groove or flute, and sometimes the system is referred to as a ¾ drill system. Gundrill systems can be seen in U.S. Pat. No. 5,181,812, U.S. Pat. No. 4,726,717 and Great Britain Patent Specification 1,435,166.

The second system is referred to as a single tube system which is based on external cutting fluid supply and internal chip support. Cutting fluid is typically supplied through the space between the drill tube and the drilled aperture. The cutting fluid is removed along with the chips through the central passage of the drill tube. Chip transport through the tube occurs at a relatively high velocity. The cross-section of the shank or tube can be made completely round, which provides much higher rigidity than in the gundrill system.

The third system is referred to as the double wall or ejector system where the cutting fluid is pumped to the cutting face through the space between an inner and an outer tube. This configuration eliminates the need for a high pressure seal between the workpiece and the drill bushing. At least a portion of the cutting fluid is delivered to the drill head, where it is forced through a number of apertures to lubricate and cool cutting edges of the drill head. An example of an ejector system can be seen in U.S. Pat. No. 3,511,120.

Deep hole drilling machines can also be broken down into two main groups, single cutting edge tools, sometimes referred to as single lip, end cutting tools, and multiple edge cutting tools, sometimes referred to as multiple-lip cutting tools. All gun-type tools are single lip, end cutting tools, incorporating bearing pads to support and guide the tool. When a second lip is added to a gun-type tool, the guidance principle changes, and the tool becomes a multiple-lip high pressure coolant tool rather than a gun-type tool. For a given workpiece material, the same factors effecting chip formation with gun-type tools (rotational speed, longitudinal feed, nose or point angle and coolant pressure and flow rate) effect chip formation with multiple-lip tools. Multiple-lip tool applications are best suited for brittle materials that produce powder, grain or sliver chips. These brittle materials may include cast metals, such as cast magnesium, aluminum, iron, brass and bronze, as well as non-metals such as carbon, graphite, certain woods and plastics. Multiple-lip tool applications are not well suited for ductile materials producing stringy chips where the chip removal is from the rear of the shank. For these applications, typically gun-type tools have been recommended.

The types of chips formed in a given workpiece material by a multi-lip tool can be controlled within a limited range. Increasing the tool rotational speed makes the chips thinner. The simplest way to reduce chip size when using multiple-lip tools is to increase the longitudinal feed rate, making the chips thicker so that they will break rather than curl. If this fails to solve the problem, the next typical corrective measure is to change the geometry of the tip. By increasing the outside angle, the point makes a deeper crease in the chip, possibly splitting the chip lengthwise. As a last resort, chip breakers are typically added on multiple-lip tools similar to those used on gun-type tools. However, chip breakers are often more difficult to add to multiple-lip tools. The coolants have the same function in chip formation and control when using multiple-lip tools as the coolants do in gun-like tools. High quality, light viscosity coolants let the chips slide freely off the cutting edge, making the chips thinner and possibly allowing increased feeds.

A multiple-lip internal chip removal drill is similar in design to the internal chip removal gundrill, but has a cutting edge divided into three sections. The three cutting edges are located on a straight line across the center of the drill. One cutting edge starts at the periphery of the tip and cuts through approximately 40% of the radius. Another cutting edge cuts through the center, and approximately 40% of the radius on the same side of center as the peripheral cutting edge. The third cutting edge is located in the center of the radius 180° from the other two edges and partially overlaps the cutting area of the other two cutting edges. This three-lip arrangement, with cutting edges on both sides of center, gives the tool partially balanced cutting forces, and takes some of the load off of the bearing pads. The bearing pads are located at about 90° and 180° from the peripheral cutting edge. The chips exit through two chip mouths, located on each side of center. The chips are forced into the chip mouths by high pressure coolant, which may be forced around the outside of the tool by a fluid transfer unit for a single tube system or forced between the outer tube and the inner tube for a double wall or ejector system.

Deep hole drilling machines are often designed with a rotating workpiece, a rotating tool or both a rotating workpiece and a rotating tool. When machining asymmetric workpieces, a rotating drill and a non-rotating workpiece is typically provided, since the workpiece cannot rotate at sufficient speed. When boring long, slender workpieces, a non-rotating drill is typically fed into a rotating workpiece. If a high tolerance bore is required, both the drill and the workpiece may rotate with the drill rotating in an opposite direction from that of the workpiece.

While double wall or ejector drilling and gundrilling have been adapted for configurations with rotating tooling and stationary workpieces, a satisfactory configuration of a single tube system with rotating tooling and stationary workpieces has not been achieved. The prior known gundrills, where cutting fluid is supplied through a passage in the drill shank to flush chips out away from the drill head through a V-shaped trough in the drill shank, can drill a 78 inch deep bore of 0.906 inch diameter in approximately 1 ½ hours.

SUMMARY OF THE INVENTION

In the present invention, the drilling apparatus provides a rotating single tube system that can be used in conjunction with large workpieces which must remain stationary. The drill shank and drill head are rotated relative to the workpiece with a single tube system configuration for delivery of the cutting fluid to the drill head. The deep boring drill according to the present invention can drill a 78 inch bore of 0.906 inch diameter in approximately 8 to 10 minutes, rather than the 1 ½ hours or 90 minutes for the gun drill configuration. The drill tube or shank rotates, while the workpiece remains stationary, and the pressure head has been modified to allow for this rotation. Cutting fluid is introduced along the external periphery of the drill tube to flush chips away from the drill head and out through a central passage in the drill tube.

It is desirable in the present invention to provide a rotatable single tube system for deep bore drilling of stationary workpieces, where the cutting fluid is introduced through a passage defined between an external surface of the tube or shank and the wall of the aperture being bored to flush chips from the cutting head for exit from the aperture being bored through the central passage of the tube or shank. It is further desirable in the present invention to unexpectedly increase the efficiency of deep bore drilling over that previously possible with a gun drill system.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
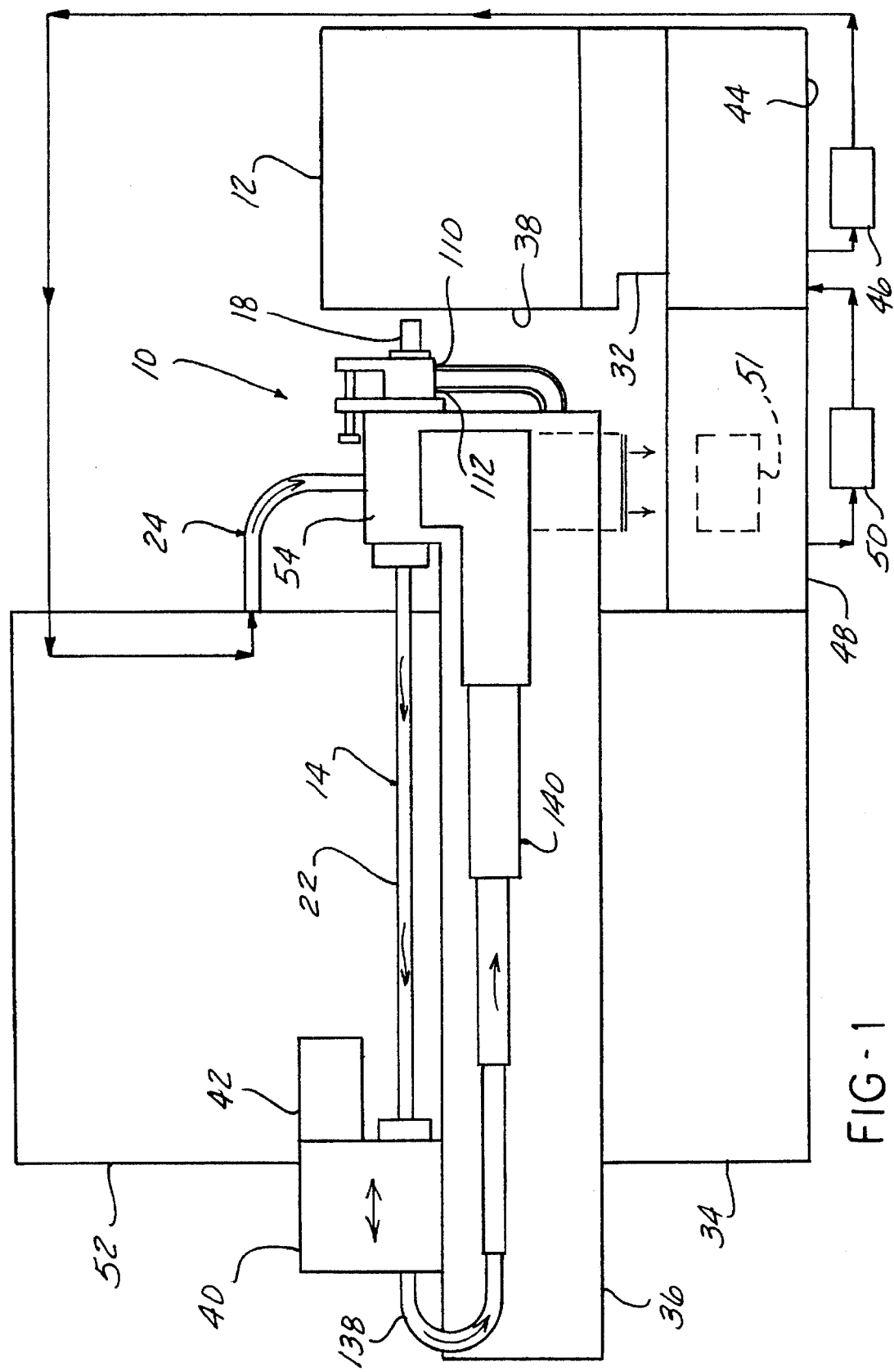
FIG. 1 is a simplified schematic view of a deep bore drilling machine having a rotatable single tube system.

A deep bore drilling apparatus 10 is illustrated schematically in FIG. 1. The deep bore drilling apparatus 10 is used for penetrating material, such as a workpiece 12. Elongated, rotary tool means 14 is provided for boring an aperture 16 in the workpiece 12 by turning about a longitudinal axis, sometimes referred to as the Z-axis, and moving along the Z-axis relative to the workpiece 12 during a cutting operation. The tool means 14 includes a cutting head 18 mounted on an end 20 of an elongated hollow shaft 22. Fluid circulation means 24 brings a flowable substance temporarily into engagement with the workpiece 12 during the cutting operation. The circulation means 24 forces the substance, such as cutting fluid or oil, to flow in a passage 26 defined by an external surface 28 of the shaft 22 and the workpiece 12 toward the cutting head 18 along an entire longitudinal length of the aperture 16 being bored. The substance exits from the aperture 16 through the central passage 30 defined in the hollow shaft 22 after flushing cut material or chips from the cutting head 18.

The workpiece 12 is held in a stationary position on a table 32 capable of moving along an axis, sometimes referred to as the X-axis disposed perpendicular to the plane of FIG. 1. If required by the size of the workpiece 12, a table extension (not shown) may be provided for sufficient support to prevent movement of the clamped workpiece in response to the increased force applied to the workpiece 12 by the nosepiece 56 and increased feed rate along the Z-axis. Connected to the table 32 is a column 34 supporting a base 36. If desired, the column 34 may be of the appropriate configuration to allow vertical adjustment of the rotary tool means 14 along an axis sometimes referred to as the Y-axis, with respect to the workpiece 12 using structural configurations that are known in the art. The base 36 may also be movable along an axis, sometimes referred to as the W-axis, toward the workpiece 12 sufficiently to allow sealing engagement between the workpiece 12 and nosepiece 56. The base 36 should preferably be capable of at least 12 inches of movement toward the workpiece 12 with respect to the column 34. In addition, or in the alternative, base 36 may be configured to allow horizontal movement parallel to the upwardly extending sidewall 38 of the workpiece 12 using structure that is known to those skilled in the art. Of course, if the base 36 and/or column 34 supporting the elongated, rotary tool means 14 is designed to be stationary, the table 32 may be provided with the appropriate adjustments for vertical and horizontal placement of the workpiece with respect to the shaft 22, so that the shaft 22 and the aperture 16 to be bored can be placed in a coaxial relationship with one another.

The elongated, rotary tool means 14 includes a linear drive means 40 for moving the elongated, hollow shaft 22 in reciprocal movement along its longitudinal Z-axis toward and away from the workpiece to accomplish drilling of the aperture 16 and removal of the cutting head 18 from the drilled aperture 16 when the cutting operation is completed. Rotary drive means 42 is also provided as part of the elongated, rotary tool means 14, for rotating the elongated, hollow shaft 22 about its longitudinal axis.

A reservoir 44 is provided for storing a predetermined quantity of flowable substance, such as cutting oil or the like. The reservoir 44 forms part of the fluid circulation means 24. The fluid circulation means 24 also includes pump means 46 for drawing fluid from the reservoir 44 for pressurized discharge through the passage 26 defined by the external surface 28 of the shaft 22 and the aperture 16 to flush cut material or chips from the area of the cutting head 18 through the central passage 30 in the hollow shaft 22 for subsequent discharge into a return reservoir 48. The return reservoir 48 is for holding a predetermined amount of used flowable substance, such as cutting oil or fluid including cut material or chips. The return reservoir 48 may include appropriate filtering means 50 for separating the cut material or chips from the fluid, so that clean fluid may be returned to the reservoir 44 for reuse. In the preferred embodiment, cooling means 51 is provided for cooling the flowable substance as required due to the increased heat generated with the faster feed rate of the drill.

Control means 52 is provided for controlling the rate of rotation of the rotary drive means 42, for controlling the rate of linear advancement of the cutting head 18 toward the workpiece 12 by linear drive means 40, for controlling the relative positioning of the cutting head 18 with respect to the sidewall 38 of the workpiece 12, and/or the rate of fluid flow and pressure of the fluid circulation means 24. The control means 52 may include electronic controls providing numerically adjustable settings to the degree of accuracy required as is conventional in the art. The control means 52 may also include software controls allowing user set parameters as desired. In addition, it has been found desirable to provide a dwell in the drilling operation so that the drill head is backed away from the workpiece being drilled prior to terminating the rotation of the drill head. If such a dwell is not provided, it has been found to result in a high incidence of cutting tool breakage when the drill head is stopped inside the workpiece abutting against the workpiece being drilled.

Figure 2A:
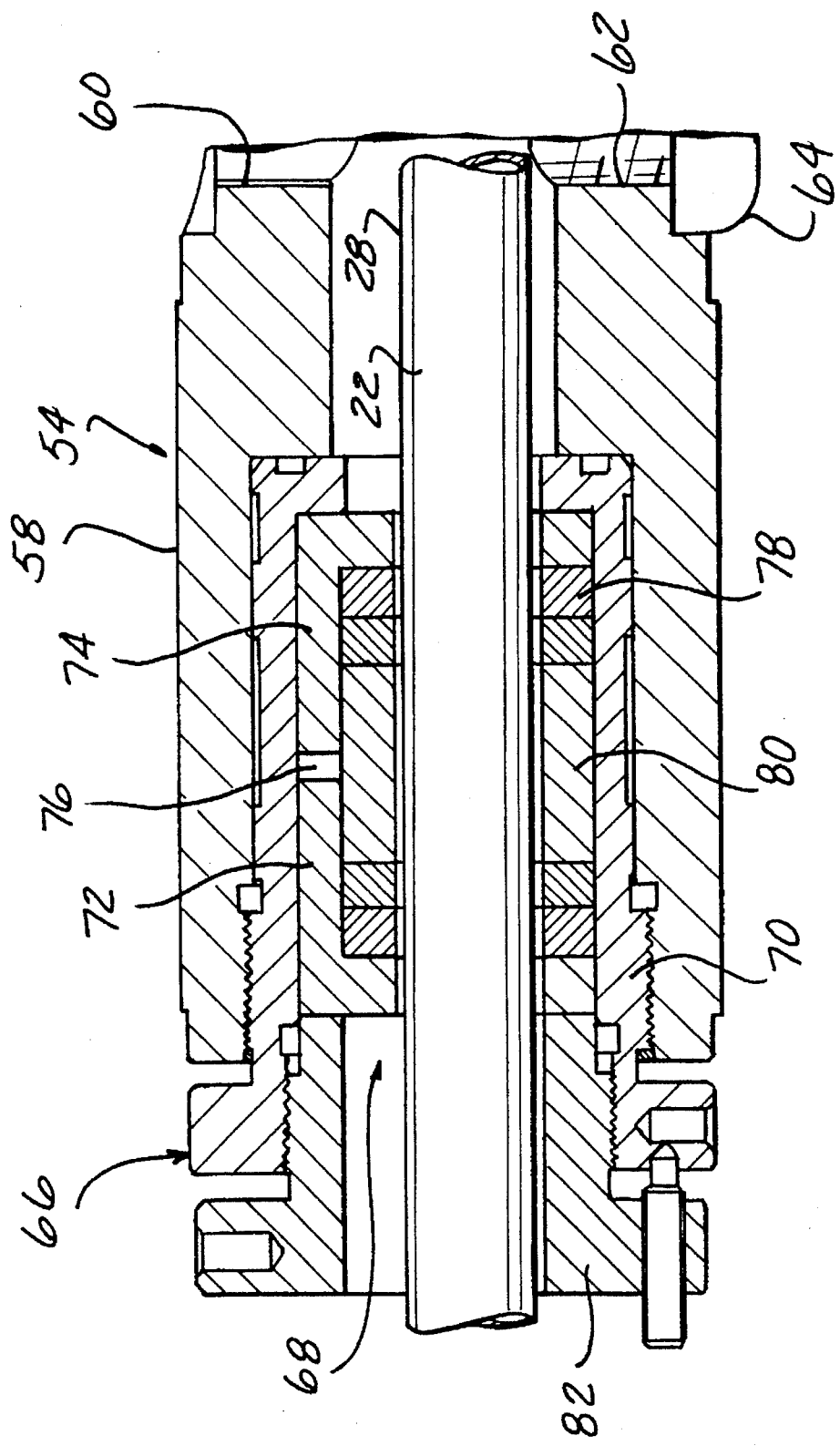
FIG. 2A and 2B are detailed cross-sectional views of a pressure head having fluid circulation passages according to the present invention.
Figure 2B:
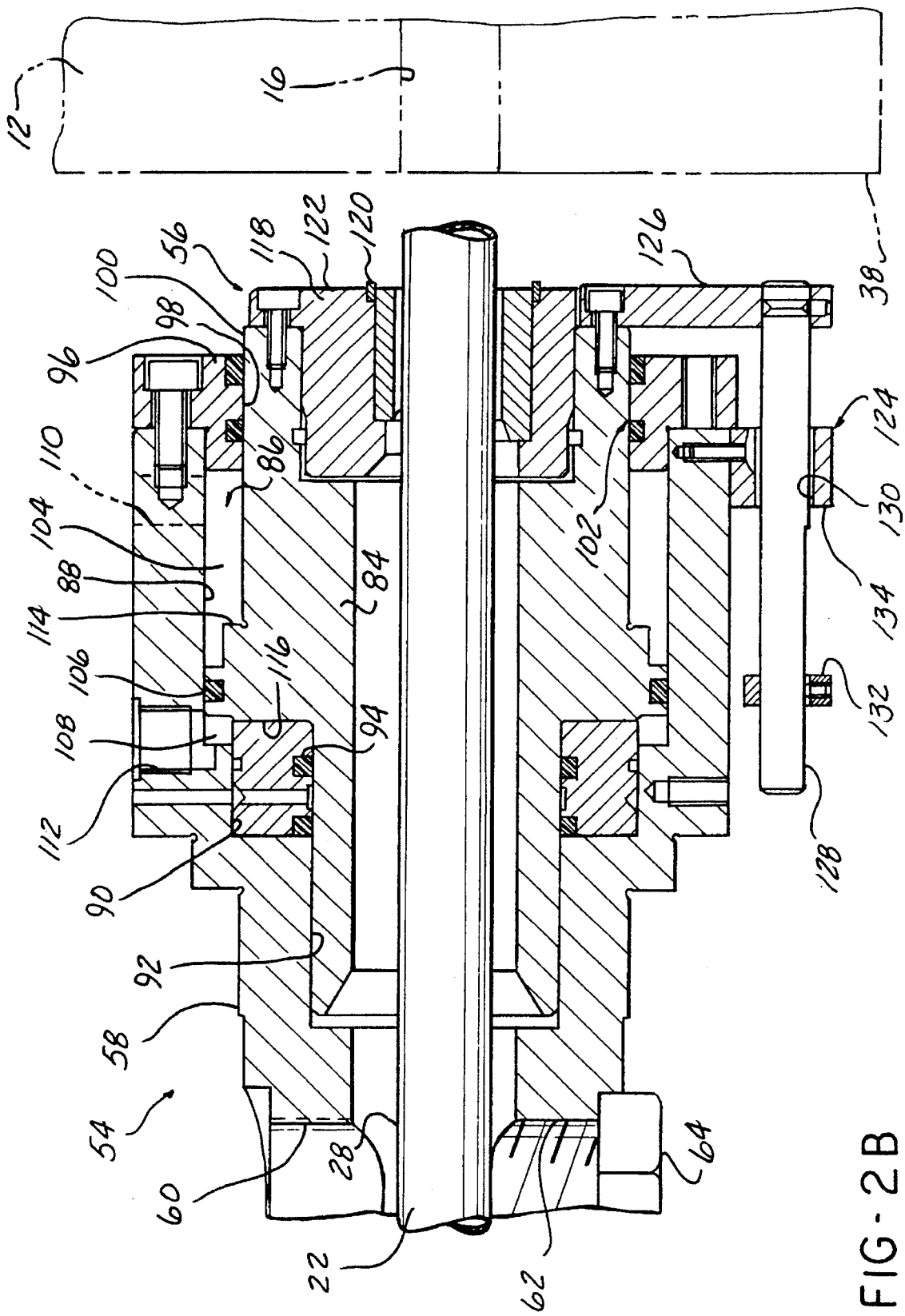

The present invention provides a modified pressure head 54 and nosepiece 56 as best seen in FIGS. 2A and 2B. The pressure head 54 includes a stationary housing 58 supported from the base 36 and is held stationary with respect to the base 36. The housing 58 is elongated in the longitudinal direction and sheaths a portion of the longitudinal length of the shaft 22 adjacent the workpiece 12. A flowable substance port 60 is provided in the housing 58 approximately midway along its longitudinal length allowing fluid communication of the flowable substance, such as cutting fluid, oil or the like, with an external surface 28 of the shaft 22. A second port 62 opposite from port 60, is not used and may be blocked off by a suitable plug 64.

As depicted in FIG. 2A, the left-hand side of the housing 58 is positioned closest to the linear drive means 40 and rotary drive means 42. This portion of the housing 58 includes seal means 66 engagable with the external surface 28 of the shaft 22 as it rotates and reciprocates with respect to its longitudinal axis to prevent substantial flowable substance leakage through this end of the housing 58. The seal means 66 preferably includes a packing seal or gland 68 defined by a seal housing 70 fixably engaged in the longitudinal end of the housing 58, such as by a threaded fitting connection. Disposed within the seal housing 70 are first and second rigid seal members, 72 and 74 respectively, spaced longitudinally from one another to define a seal receiving chamber 76 therebetween. The first and second rigid seal members 72 and 74 are spaced longitudinally from one another sufficiently to allow compressive movement toward one another to reduce the size of the seal receiving chamber 76. Multiple seals 78 and at least one spacer 80 may be disposed within the seal receiving chamber 76. A threaded bolt 82 is engaged in the longitudinal end of the seal housing 70 to compressively urge the first and second rigid seal members 72 and 74 toward one another, thereby reducing the size of the seal receiving chamber 76 and forcing the seals 78 toward the external surface 28 of the shaft 22.

On the opposite longitudinal end of the housing 58, as shown in FIG. 2B, the nosepiece 56 faces the upwardly extending surface 38 of the workpiece 12. The nosepiece 56 includes a longitudinally reciprocal piston 84 disposed within an enlarged aperture 86 formed in the longitudinal end of the housing 58. The enlarged aperture 86 preferably is largest with respect to its transverse dimension adjacent the longitudinal end of the housing 58 defined by first surface 88. The enlarged aperture 86 preferably is a stepped aperture having transversely reduced dimensions progressively inward along the longitudinal length of the housing 58 from the longitudinal end as defined by second surface 90 and third surface 92. A seal member 94 engages between the second surface 90 and the piston 84 and preferably seats against an annular shoulder formed between the second surface 90 and third surface 92.

An end cap 96 is releasably connected to the outer longitudinal end of the housing 58 forming an enclosed reciprocal chamber for the piston 84. The end cap 96 includes an aperture 98 therethrough for allowing passage of a protruding portion 100 of piston 84. Seal means 102 is disposed between the end cap 96 and the protruding portion 100 of the piston 84 for preventing substantial leakage of actuator fluid from a first chamber 104 disposed between the end cap 96 and a piston seal 106 engaging with the first surface 88. A second chamber 108 is defined between the seal member 94 and the piston seal 106 engaging with the first surface 88. A first port 110 extends through the housing 58 in fluid communication with the first chamber 104 and a second port 112 extends through the housing 58 in fluid communication with the second chamber 108. The first and second ports, 110 and 112 respectively, allow controlled expansion and contraction of the first and second chambers, 104 and 108 respectively, thereby controlling longitudinal extension and retraction of the nosepiece 56 toward and away from the workpiece 12.

A first stop surface 116 is formed on the piston 84 to engage with the member supporting the seal member 94 when the nosepiece 56 is in the fully retracted position within the housing 58. A second stop surface 114 is formed on the piston 84 for engagement with the end cap 96 when the nosepiece 56 is in the fully extended position. A seal supporting member 118 is fixedly connected to the outer end of the piston 84. A workpiece engaging seal 120 is disposed on the outer face 122 of the seal supporting member 118 circumscribing the shaft 22 such that as the piston 84 is moved from the fully retracted position toward the extended position, the seal 120 engages with the upwardly extending surface 38 of workpiece 12 in a sealed fashion.

An externally adjustable stop means 124 may be provided connected to the piston 84 for setting a predetermined amount of longitudinal extension of the nosepiece 56 beyond the longitudinal end of the housing 58. The stop means 124 may include a plate 126 fixedly connected to the outer longitudinal end of the piston 84. A longitudinally extending stop bar or pin 128 may be connected to the radially extending plate 126, such that the stop bar or pin 128 extends longitudinally in a direction away from the workpiece 12 external of the housing 58. The housing 58 may also include a guide aperture 130 for slidably receiving the stop bar or pin 128. An adjustable stop 132 may be releasably attached to the stop bar or pin 128 for movement to a desired longitudinal position therealong. The stop 132 may be releasably affixed at a desired position on the pin 128 to prevent further longitudinal extension of the nosepiece 56 when the stop 132 engages against a surface 134 on the housing 58 adjacent the guide aperture 130.

Figure 3:
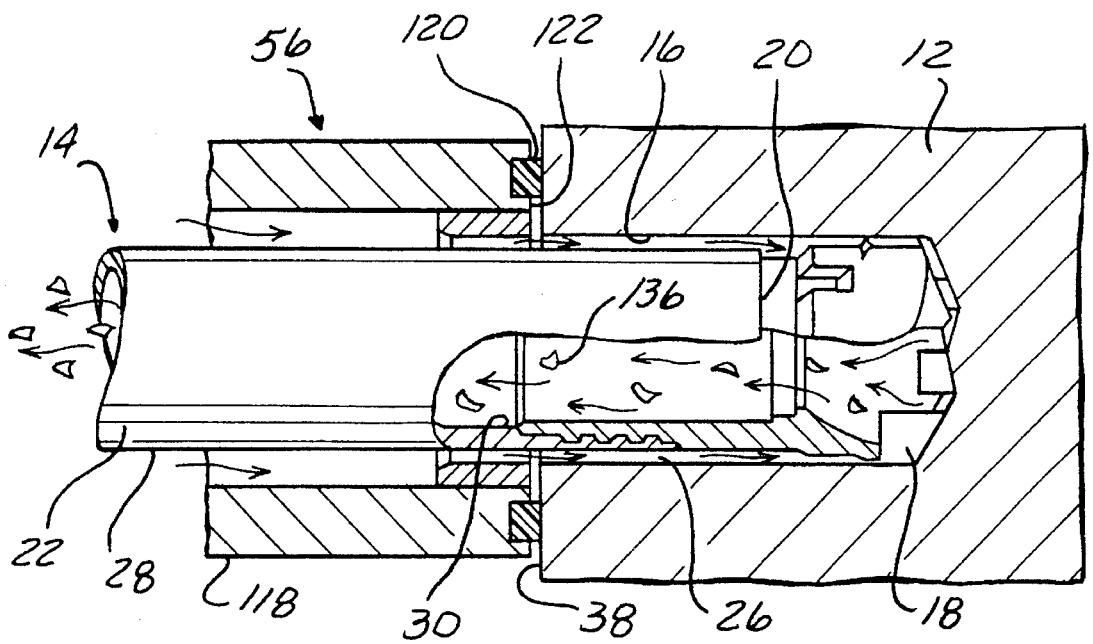
FIG. 3 is a detailed cross-sectional view of a cutting head in a bore according to the present invention.

In operation, pressurized actuator fluid is delivered to the second chamber causing the piston 84 to extend longitudinally until sealing engagement of the workpiece engaging seal 120 with the upwardly extending surface 38 of the workpiece 12. Pump means 46 then draws the flowable substance from reservoir 44 for delivery through port 60 in the stationary housing 58 of the pressure head 54. The flowable substance then passes through the central passage of the housing 58 in fluid contact with the external surface 28 of the shaft 22 until it reaches the cutting head and workpiece interface after having passed through the sealed nosepiece-workpiece interface. As best seen in FIG. 3, the flowable substance flows in the passage 26 defined between the external surface 28 of the shaft 22 and the aperture 16 being formed in the workpiece 12 until it reaches the cutting head 18. After reaching the cutting head 18, the flowable substance flushes cut material or chips 136 away from the cutting head 18 through the central longitudinally extending passage 30 in the hollow shaft 22. The flowable substance carrying the chips 136 pass out of the workpiece 12 within the passage 30 of the shaft 22 and flow through the nosepiece 56 and pressure head 54 while still contained within the passage 30. After passing through the rotary drive means 42, the flowable substance carrying the chips 136 is transferred to a flexible conduit 138 best seen in FIG. 1. The flexible conduit 138 may include a telescopic conduit section 140 to deliver the flowable substance and chips 136 to the return reservoir 48. The telescopic conduit section 140 permits increased linear movement for the deep bore drilling apparatus, while preventing problems associated with excess flexible conduit between the shaft 22 and the return reservoir 48 as the boring operation progresses. It is desirable that the machine operator is able to visually perceive the condition of the chips during the drilling operation, so that if the chips appear long and stringy the operator can decrease the feed rate of the drill head. Therefore, a clear telescopic conduit section is desirable or the outlet to the reservoir may be positioned adjacent the operator controls.

Figure 4:
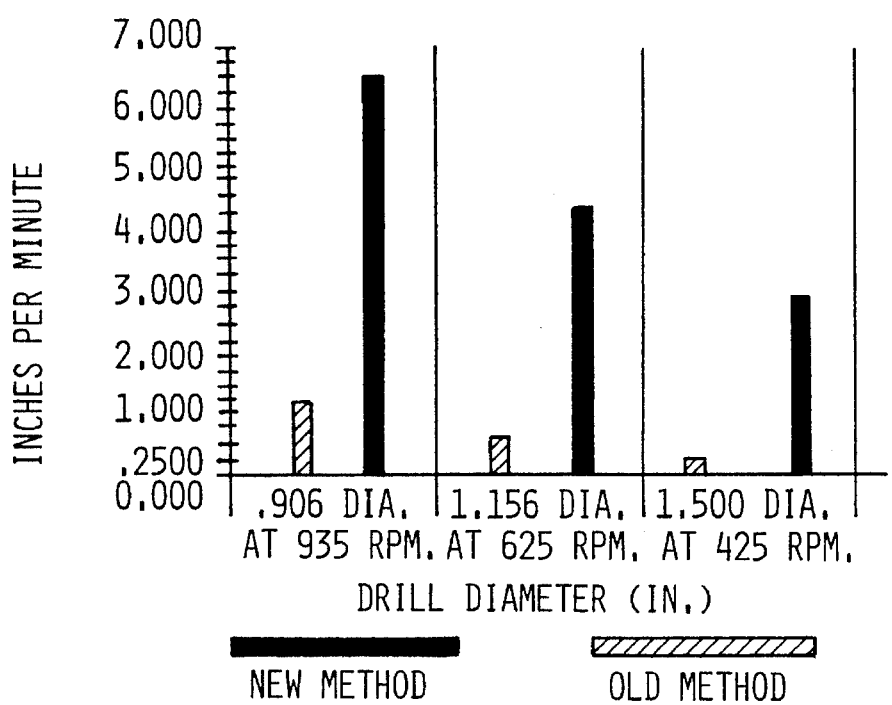
FIG. 4 is a graph depicting the feed rate in inches/per minute versus the drill diameter in inches at various revolutions per minute according to the present invention in comparison with the prior known gun drills, where cutting fluid is supplied through a passage in the drill shank to flush chips away from the drill head through a V-shaped trough in the drill shank.

FIG. 4 is a graphic illustration of the increased feed rate in inches/minute achievable with the present invention compared to the known gun drills at given drilling diameters and speeds. As can be seen, with a 0.906 inch diameter drill rotating at 935 revolutions/minute, the gun drill was capable of a feed rate between 1.000 and 1.025 inches/minute, while the present invention was capable of achieving a feed rate of approximately 6.500 inches/minute. With a 1.156 inch diameter drill rotating at 625 revolutions/minute, the known gun drill was capable of achieving a feed rate of between 0.500 and 0.750 inches/minute, while the present invention was capable of achieving a feed rate of between 4.250 and 4.500 inches/minute. With a 1.500 inch diameter drill rotating at 426 revolutions/minute, the known gun drill was capable of achieving a feed rate of approximately 0.250 inches/minute, while the present invention was capable of achieving a feed rate of between 2.750 and 3.000 inches/minute. The material drilled for each of these tests was the same, and more particularly was designated as AISI-P20 pretempered, prehardened steel having a 28–32 Rockwell Hardness. The coolants used for each test were the same, however, the flow rate of the coolant for the present invention was increased due to the increased size of the apertures as a result of the reconfiguration that reduced the effective back pressure. Therefore, in order to maintain the minimum desired pressure of 300 lbs/in$^2$, the lubricating/cooling oil system was enlarged. In addition, chip removal and an oil cooler system was added to address the extra heat generated due to the increased feed rate of the present invention. The longitudinally extending opening through the spindle shaft was enlarged to accommodate the increase in oil flow and chip removal. A hydraulic system was also added to operate the cylinder and the pressure head for sealing engagement against the surface of the workpiece to be drilled.

In order to increase the chip load capable of being handled by the cutting head and to thereby allow further increases in the feed rate of the shaft into the workpiece, it is anticipated that an increase in the power of the rotational motor, for example from 10 horsepower to 20 horsepower, should result in a drilling operation at least 8 times faster than previously provided by the known gun drill configuration. The table size for securely clamping the workpiece was also doubled in order to compensate for the increased axial force along the W-axis created by the pressure head and the increased longitudinal feed rate along the Z-axis. A gear reduction was installed on the W-axis motor to compensate for the increased force being transmitted.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A horizontal gun drilling apparatus for penetrating material comprising:

elongated rotary tool means for boring an aperture in a workpiece by turning about a longitudinal axis and moving along said axis relative to said workpiece during a cutting operation, said tool means including a cutting head mounted on an end of an elongated, hollow shaft, said shaft having a constant diameter less than said cutting head along an entire longitudinal length of said elongated shaft; and fluid circulation means for bringing a flowable substance temporarily into engagement with said workpiece during said cutting operation, said circulation means forcing said substance to flow in a passage defined by an external surface of said shaft and said workpiece toward said cutting head along an entire longitudinal length of said aperture being bored, said substance exiting said aperture through said hollow shaft after flushing cut material from said cutting head, said fluid circulation means including a sheath for receiving a portion of said constant diameter shaft therethrough while allowing rotation and axial shifting of said shaft, wherein a longitudinally extending portion of said shaft intermediate opposite ends of said shaft is sheathed therein by said fluid circulation means while said shaft is rotating and axially shifting during drilling operations, such that said constant diameter shaft extends beyond said sheathed portion in both longitudinally extending directions.

2. The drilling apparatus of claim 1 further comprising:

said tool means for forming a deep aperture having an exceptionally high ratio of depth to diameter.

3. The drilling apparatus of claim 1 further comprising:

frame means for supporting said workpiece in a stationary position relative to said tool means.

4. The drilling apparatus of claim 1 further comprising:

drive means for rotating said tool means relative to said workpiece and for moving said tool means along said axis toward said workpiece during said cutting operation.

5. The drilling apparatus of claim 1 wherein said elongated, hollow shaft further comprises:

a single wall shank for supporting said cutting head, said single wall shank capable of rotation about said axis and reciprocation along said axis.

6. The drilling apparatus of claim 1 wherein said circulation means further comprises:

a telescopic fluid return means for receiving said flowable substance from said hollow shaft and for delivering said substance to a reservoir during said cutting operation.

7. The drilling apparatus of claim 1 wherein said circulation means further comprises:

a reservoir for holding a predetermined amount of flowable substance;

pump means for drawing flowable substance from said reservoir for delivery to said passage under pressure; and return means for delivering flowable substance from said hollow shaft to a used fluid reservoir.

8. The drilling apparatus of claim 1 wherein said circulation means further comprises:

pressure head means for supporting said rotary tool means adjacent to said workpiece, said pressure head means sheathing a portion of said shaft and having an inlet port for said flowable substance in fluid communication with said external surface of said shaft; and longitudinally reciprocal nosepiece means extending outwardly from said pressure head toward said workpiece for sealing engagement therewith, such that said flowable substance is in fluid communication with said aperture being drilled during said cutting operation.

9. The drilling apparatus of claim 1 wherein said circulation means further comprises:

piston means for driving a seal into sealing engagement with said workpiece circumscribing said aperture to be drilled, said piston means reciprocally driven along said longitudinal axis of said shaft and having a central passage therethrough for said shaft with sufficient clearance to allow passage of said flowable substance along said external surface of said shaft into said aperture to be drilled.

10. A horizontal gun drilling apparatus for penetrating material comprising:

elongated rotary tool means for boring an aperture in a workpiece by turning about a longitudinal axis and moving along said axis relative to said workpiece during a cutting operation, said tool means for forming a deep aperture having a ratio of depth to diameter greater than or equal to two, said tool means including a cutting head mounted on an end of an elongated, hollow, single wall shaft, said shaft having a constant diameter less than said cutting head along an entire longitudinal length of said elongated shaft;

frame means for supporting said workpiece in a predetermined position relative to said tool means;

drive means for rotating said tool means relative to said workpiece and for moving said tool means along said axis toward said workpiece during said cutting operation; and fluid circulation means for bringing a flowable substance temporarily into engagement with said workpiece during said cutting operation, said circulation means forcing said substance to flow in a passage defined by an external surface of said shaft and said workpiece toward said cutting head along an entire longitudinal length of said aperture being bored, said substance exiting said aperture through said hollow shaft after flushing cut material from said cutting head.

11. The drilling apparatus of claim 10 wherein said circulation means further comprises:

a reservoir for holding a predetermined amount of flowable substance;

pump means for drawing flowable substance from said reservoir for delivery to said passage under pressure; and return means for delivering flowable substance from said hollow shaft to a used fluid reservoir.

12. The drilling apparatus of claim 10 wherein said circulation means further comprises:

pressure head means for supporting said rotary tool means adjacent to said workpiece, said pressure head means sheathing a portion of said shaft and having an inlet port for said flowable substance in fluid communication with said external surface of said shaft; and longitudinally reciprocal nosepiece means extending outwardly from said pressure head toward said workpiece for sealing engagement therewith, such that said flowable substance is in fluid communication with said aperture being drilled during said cutting operation.

13. The drilling apparatus of claim 10 wherein said circulation means further comprises:

piston means for driving a seal into sealing engagement with said workpiece circumscribing said aperture to be drilled, said piston means reciprocally driven along said longitudinal axis of said shaft and having a central passage therethrough for said shaft with sufficient clearance to allow passage of said flowable substance along said external surface of said shaft into said aperture to be drilled.

14. The drilling apparatus of claim 10 wherein said circulation means further comprises:

an elongated pressure head sheathing a portion of said shaft adjacent said workpiece, said pressure head having a first end and a second end, an inlet port on said pressure head disposed between said first and second ends in fluid communication with said external surface of said shaft for introduction of said flowable substance;

seal means connected to said first end of said pressure head for sealing engagement with said shaft during said cutting operation;

piston means slidably received in said second end of said pressure head for driving longitudinally along said axis of said shaft, said piston means having a passage therethrough for said shaft with sufficient clearance to allow passage of said flowable substance along said external surface of said shaft into said aperture to be drilled; and nosepiece means extending outwardly from said piston means toward said workpiece for sealing engagement with said workpiece, such that said flowable substance is in fluid communication with said aperture being drilled during said cutting operation.

15. A drilling apparatus for penetrating material comprising:

elongated rotary tool means for boring an aperture in a workpiece by turning about a longitudinal axis and moving along said axis relative to said workpiece during a cutting operation, said tool means for forming a deep aperture having a ratio of depth to diameter greater than or equal to two, said tool means including a cutting head mounted on an end of an elongated, hollow, single wall shaft;

frame means for supporting said workpiece in a predetermined position relative to said tool means;

drive means for rotating said tool means relative to said workpiece and for moving said tool means along said axis toward said workpiece during said cutting operation;

fluid circulation means for bringing a flowable substance temporarily into engagement with said workpiece during said cutting operation, said circulation means forcing said substance to flow in a passage defined by an external surface of said shaft and said workpiece toward said cutting head along an entire longitudinal length of said aperture being bored, said substance exiting said aperture through said hollow shaft after flushing cut material from said cutting head, wherein said circulation means further includes an elongated pressure head sheathing a portion of said shaft adjacent said workpiece, said pressure head having a first end and a second end, an inlet port on said pressure head disposed between said first and second ends in fluid communication with said external surface of said shaft for introduction of said flowable substance, seal means connected to said first end of said pressure head for sealing engagement with said shaft during said cutting operation, piston means slidably received in said second end of said pressure head for driving longitudinally along said axis of said shaft, said piston means having a passage therethrough for said shaft with sufficient clearance to allow passage of said flowable substance along said external surface of said shaft into said aperture to be drilled, and nosepiece means extending outwardly from said piston means toward said workpiece for sealing engagement with said workpiece, such that said flowable substance is in fluid communication with said aperture being drilled during said cutting operation; and externally adjustable stop means, connected to said nosepiece means, for setting an outer limit of reciprocal movement toward said workpiece.

16. The drilling apparatus of claim 10 wherein said circulation means further comprises:

a telescopic fluid return means for receiving said flowable substance from said hollow shaft and for delivering said substance to a reservoir during said cutting operation.

17. A drilling apparatus for penetrating material comprising:

elongated rotary tool means for boring an aperture in a workpiece by turning about a longitudinal axis and moving along said axis relative to said workpiece during a cutting operation, said tool means for forming a deep aperture having a ratio of depth to diameter greater than or equal to five, said tool means including a cutting head mounted on an end of an elongated, hollow, single wall shaft;

frame means for supporting said workpiece in a predetermined position relative to said tool means;

drive means for rotating said tool means relative to said workpiece and for moving said tool means along said axis toward said workpiece during said cutting operation; and fluid circulation means for bringing a flowable substance temporarily into engagement with said workpiece during said cutting operation, said circulation means forcing said substance to flow in a passage defined by an external surface of said shaft and said workpiece toward said cutting head along an entire longitudinal length of said aperture being bored, said substance exiting said aperture through said hollow shaft after flushing cut material from said cutting head, said circulation means including:

a reservoir for holding a predetermined amount of flowable substance;

pump means for drawing flowable substance from said reservoir for delivery to said passage under pressure;

return means for delivering flowable substance from said hollow shaft to a used fluid reservoir;

an elongated pressure head sheathing a portion of said shaft adjacent said workpiece, said pressure head having a first end and a second end, an inlet port on said pressure head disposed between said first and second ends in fluid communication with said external surface of said shaft for introduction of said flowable substance;

seal means connected to said first end of said pressure head for sealing engagement with said shaft during said cutting operation;

piston means slidably received in said second end of said pressure head for driving longitudinally along said axis of said shaft, said piston means having a passage therethrough for said shaft with sufficient clearance to allow passage of said flowable substance along said external surface of said shaft into said aperture to be drilled;

nosepiece means extending outwardly from said piston means toward said workpiece for sealing engagement with said workpiece, such that said flowable substance is in fluid communication with said aperture being drilled during said cutting operation; and externally adjustable stop means, connected to said nosepiece means, for setting an outer limit of reciprocal movement toward said workpiece.

18. In a horizontal gun drilling apparatus for penetrating material, the drilling apparatus including elongated rotary tool means for boring an aperture in a workpiece by turning about a longitudinal axis and moving along said axis relative to said workpiece during a cutting operation, the improvement comprising:

said tool means further including a cutting head mounted on an end of an elongated hollow shaft, said shaft having a constant diameter less than said cutting head along an entire longitudinal length of said elongated shaft; and fluid circulation means for engaging a flowable substance with said workpiece during said cutting operation, said circulation means forcing said substance to flow in a passage defined by an external surface of said shaft and said workpiece toward said cutting head along an entire longitudinal length of said aperture being bored, said substance exiting said aperture through said hollow shaft after flushing cut material from said cutting head.

19. The drilling apparatus of claim 18 further comprising:

control means for controlling a rate of rotation of said hollow shaft, for controlling a rate of linear advancement of said cutting head with respect to said workpiece, for controlling a relative position of said cutting head in a generally vertically extending plane with respect to said workpiece, and for controlling a rate and pressure of flowable substance through said fluid circulation means.

20. The drilling apparatus of claim 18 further comprising:

control means for backing said cutting head away from said workpiece prior to terminating rotation of said hollow shaft.

* * * * *